Figure 1:
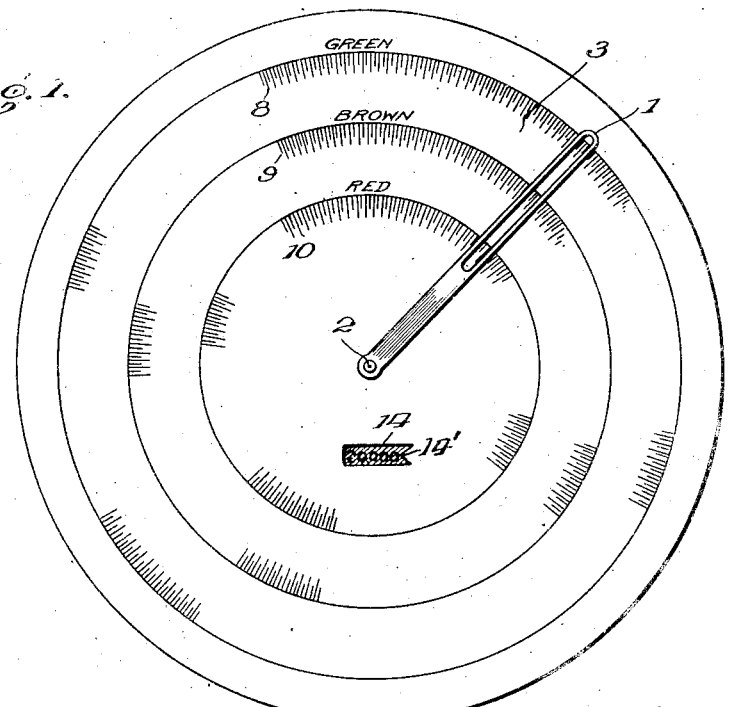

June 9, 1931.  W. C. MORAN  1,809,525

INDICATOR MECHANISM

Filed Feb. 9, 1931

Inventor
William C. Moran,
By
Pennie Davis Marvin Edmonds
Attorneys

Patented June 9, 1931

1,809,525

UNITED STATES PATENT OFFICE

WILLIAM C. MORAN, OF LAUREL SPRINGS, NEW JERSEY, ASSIGNOR TO RIEHLE BROS. TESTING MACHINE COMPANY, OF PHILADELPHIA, PENNSYLVANIA, A CORPORATION OF PENNSYLVANIA

INDICATOR MECHANISM

Application filed February 9, 1931. Serial No. 514,573.

This invention relates to indicating devices wherein a dial and pointer, one of which, usually the pointer, is rotated to indicate a value of some kind.

In indicating devices of this character it is usual to have the rotating element to make only one revolution or a fraction thereof, and the length of the scale is, therefore, limited to the circumference of the dial or other stationary element upon which the scale is depicted. For this reason, when it is desired to have a scale register a large amount and to graduate the scale so that each gradation will represent a relatively small unit, it is necessary to have the dial very large in diameter or else the gradations will be so close together as to render the scale unreadable. As an increase in the size of the dial is not practical beyond certain limits, it is customary in indicating devices for measuring large values, to have the gradations represent proportionately large units. For example, an indicating device having a scale for measuring as much as 50,000 units might be so graduated that each gradation would represent 100 units. It is thus exceedingly difficult to obtain an accurate reading, which is always desirable and in many cases essential.

According to the preferred form of the present invention an indicating device is provided in which either the pointer or dial, preferably the pointer, is adapted to rotate through a plurality of revolutions. This enables the dial to be graduated with several scales, one corresponding to each revolution, and permits the use of a sufficiently large number of gradations to enable each one to represent a relatively small unit.

As the rotating element makes more than one revolution and as there are several scales, it is necessary at all times to know which scale should be read. In order to indicate the proper scale to be read at any time, an indicator for this purpose is driven from the same source from which the rotatable element is driven. This indicating device comprises a placard having a series of colored areas or other symbols thereon. This placard is so mounted as to move up and down behind a display opening as the rotatable element revolves, so that different ones of the symbols may be brought into view. Where the indicating device is one of a type comprising a pointer which rotates over a fixed circular scale, the display opening may be provided in the dial upon which the scale is depicted, although it could be located in some other part of the indicating device if desired. In the preferred embodiment of the invention the color of each of the areas of the placard corresponds with the color of a certain scale or set of figures, and the colored areas are so arranged that by reading the scale which matches with the area in view the correct value is obtained.

The invention will be further described by reference to the accompanying drawings, but it will be understood that this more detailed description and illustration is intended as an exemplification of the invention and that it is not limited thereto. In the drawings, Figure 1 is an elevation of the indicating device and shows the concentric scales over which the movable pointer rotates; and Fig. 2 is a sectional view of the same, the section being taken just behind the front dial.

Figure 2:
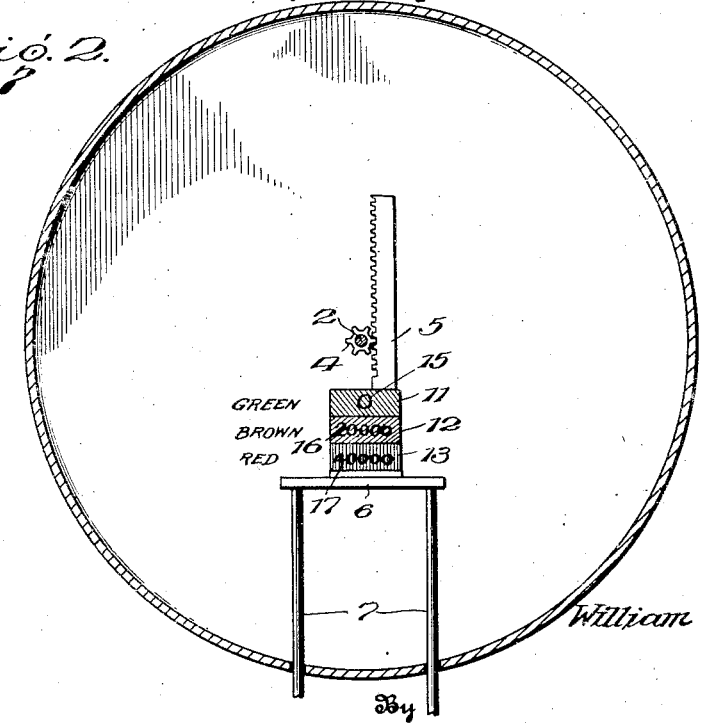

Referring to Fig. 1, the numeral 1 indicates a pointer mounted upon a shaft 2 and adapted to rotate over the face of a dial 3. The shaft 2 is suitably mounted in the dial casing and has fixed thereon a pinion 4 which is driven through a rack 5. The ratio of the number of teeth on the pinion 4 to the number on the rack 5 is such that a full movement of the rack in one direction is sufficient to cause the pinion 4 and the pointer 1 operated thereby to make several revolutions over the dial face.

The rack 5 is connected to the crosshead 6 and drive rods 7, so that when an external force (not shown) is exerted on the rods 7 a vertical movement will be imparted to the rack 5. However, the rack 5 may have movement imparted to it by other well known means, e. g. a spring, bourdon tube, curved racks, or ordinary gears.

The dial face 3 has depicted thereon a plurality of concentric scales 8, 9 and 10 which indicate the angular position of the pointer.

As the pointer is adapted to rotate a plurality of times over the dial face 3, it is essential to know which scale should be read to obtain a correct reading. In order that the observer may know at a glance which scale is to be read there is affixed to the rack 5 and crosshead 6 a placard bearing a plurality of symbols, 11, 12 and 13, one for each scale, and preferably in the form of colored areas. The respective scales are also preferably colored to correspond to the colored areas 11, 12 and 13. The symbols 11, 12 and 13 are rendered visible by means of a display opening 14.

In some cases the colored areas may be replaced by symbols 15, 16 and 17 representing a certain number of units, or such representation of a number of units may be indicated in the colored areas as is clearly shown in Fig. 2. In such instances the unit represented on the area normally in view, or the upper one, will be zero, and the number of units represented on the succeeding areas will progressively increase by a number equal to the number of units respresented by one revolution of the pointer 1 over the dial. Thus, if one revolution of the pointer indicates a force of 20,000 units the first number indicated would be zero and the succeeding ones 20,000, 40,000 etc. With such symbols the two inner scales may or may not be used. If they are not used it is only necessary for the one making the reading to add the number of units 15, 16 or 17 visible through the opening 14, to that actually indicated by the pointer to obtain the correct reading. Thus if the pointer would indicate 2,500 units and the symbol "20,000" was visible through the opening 14, the correct reading would be 22,500.

In operation, when an external force is exerted on the drive rods 7, the rack 5 is gradually moved upward and causes the rotation of pinion 4 and pointer 1. Before any force has been exerted upon the rods 7, and until sufficient force has been exerted to raise the rack 5 sufficiently to cause the pointer 1 to make one complete revolution over the dial face 3, the first symbol 11 will be displayed through the opening 14, but as the pointer begins its second revolution, the symbol 14 will pass from view and leave only the second symbol 12 in view, and as the pointer begins its third revolution the third symbol 13 only will be left visible. It will thus be apparent that by merely looking at that portion of the placard visible through the opening 14, the observer can tell which of the scales 8, 9 or 10 should be read, or, if only one scale is used, what amount should be added to the amount indicated by the pointer.

In some cases the opening 14 is provided with a pointer which may comprise a fine wire extending thereacross, or a pointed extension 14' of the side of the opening. In this case the symbols pass behind the pointer and the pointer indicates the symbol to be used.

The invention has been described in connection with an indicating device comprising a stationary dial and rotating pointer, but it is obvious that the dial could be made to rotate and the pointer held stationary and, also, that the invention is applicable for use with cylindrical dials. It will also be apparent that if desired the scale may be continuous, that is, in the form of a spiral, instead of being in the form of concentric rings.

I claim:

1. In a device of the type described, a dial, a single pointer, means for causing a rotary motion of at least one of the aforementioned elements through more than one revolution, a scale on said dial corresponding to each revolution, and means comprising an indicator associated with said rotatable element for indicating which scale corresponds to the revolutions of the rotatable element at any time.

2. In a device of the type described, a dial, a single pointer, means for causing rotary motion of at least one of the aforementioned elements through more than one revolution, a series of concentric scales on said dial, one corresponding to each revolution of said rotatable element and means comprising an indicator associated with said rotatable element for indicating which scale corresponds to the revolutions of the rotatable element at any time.

3. In a device of the type described, a dial, a pointer, means for causing a rotary motion of at least one of said aforementioned elements through more than one revolution, a series of differently colored scales on said dial, one corresponding to each revolution of said rotatable element, and means comprising a series of colored areas movable into view for indicating which scale corresponds to the revolutions of the rotatable element at any time.

4. In a device of the type described, a dial, a pointer, means for causing a rotary motion of at least one of said aforementioned elements through more than one revolution, a series of differently colored scales on said dial, one corresponding to each revolution of said rotatable element, and means comprising a series of colored areas movable past a display opening by mechanism geared to said rotatable element for indicating which scale corresponds to the revolutions of the rotatable element at any time.

5. In a device of the type described, a dial, a pointer, means for causing a rotary motion of at least one of said aforementioned elements through more than one revolution, a series of differently colored scales on said dial, one corresponding to each revolution of said rotatable element, and means comprising a series of colored blocks movable past a display opening, the color of said scales and blocks corresponding, for indicating which scale corresponds to the revolutions of the rotatable element at any time.

6. In a device of the type described, a pointer rotatable through more than one revolution, a dial, a plurality of scales on said dial, one corresponding to each revolution, and means comprising a series of symbols movable past a display opening for indicating which scale corresponds to the revolutions of the rotatable element at any time.

7. In a device of the type described, a pointer rotatable through more than one revolution, a dial, a plurality of scales on said dial, one corresponding to each revolution, and means comprising a series of colored areas movable past a display opening, the colors of said scales and areas corresponding, for indicating which scale corresponds to the revolutions of the rotatable element at any time.

8. In a device of the type described, a pointer rotatable through more than one revolution, a dial, a series of different colored concentric scales on said dial, one corresponding to each revolution of said pointer and means comprising a series of colored areas movable past a display opening by the mechanism which drives the rotatable pointer, the colors of said scales and said blocks corresponding to indicate which scale corresponds to the number of revolutions made by the rotatable pointer at any time.

9. In a device of the type described, a dial, a pointer rotatable over said dial, means for actuating said pointer through more than one revolution, and means operable by said actuating means for indicating the number of revolutions made by the pointer.

10. In a device of the type described, a dial having a plurality of scales thereon, a pointer rotatable over said dial and through more than one revolution, a rack and pinion for rotating said pointer, means for reciprocating said rack, a placard operable with said rack and having a symbol thereon corresponding to each scale, the respective symbols being brought into view as the rack is reciprocated.

11. In a device of the type described, a calibrated dial, a single pointer movable over said dial, means for rotating said pointer through more than one revolution, and means associated with and operated by the pointer-operating means for indicating the number of revolutions made by said pointer.

12. In a device of the type described, a calibrated dial, a pointer movable over said dial, means for rotating said pointer through more than one revolution, and a series of symbols movable past a display opening and associated with and operated by the pointer-operating means for indicating the number of revolutions made by said pointer.

13. In a device of the type described, a calibrated dial, a pointer movable over said dial, means for rotating said pointer through more than one revolution, and a placard movable past a display opening and having indicated thereon a plurality of numbers of units, the number of units progressively increasing by an amount equal to the amount measured by the pointer in making one revolution over the face of the dial, said placard being associated with and operated by the pointer-operating means for indicating the number of revolutions made by said pointer.

In testimony whereof I affix my signature.
WILLIAM C. MORAN.